US012812366B1

(12) United States Patent
Nema

(10) Patent No.: US 12,812,366 B1
(45) Date of Patent: Nov. 24, 2026

(54) SYSTEMS AND METHODS FOR EPISTEMIC ENGINEERING AND SCALABLE CERTIFICATION OF REASONING DURABILITY USING AI-MEDIATED TRUTH-CONSTRAINED PEDAGOGICAL SEMANTIC GROUNDING

(71) Applicant: Waleed S Nema, Garland, TX (US)

(72) Inventor: Waleed S Nema, Garland, TX (US)

( * ) Notice: Subject to any disclaimer, the term of this patent is extended or adjusted under 35 U.S.C. 154(b) by 8 days.

(21) Appl. No.: 19/643,442

(22) Filed: Apr. 9, 2026

Related U.S. Application Data

(63) Continuation-in-part of application No. 19/463,664, filed on Jan. 29, 2026, which is a continuation-in-part of application No. 19/452,170, filed on Jan. 16, 2026, which is a continuation-in-part of application No. 19/447,052, filed on Jan. 13, 2026, which is a continuation-in-part of application No. 19/334,453, filed on Sep. 19, 2025, now Pat. No. 12,626,249, which is a continuation-in-part of application No.
(Continued)

(51) Int. Cl.
*H04W 12/02* (2009.01)
*H04L 9/08* (2006.01)

(52) U.S. Cl.
CPC ........... *H04W 12/02* (2013.01); *H04L 9/0822* (2013.01)

(58) Field of Classification Search
CPC ....... H04W 12/02; H04L 9/0822; G06N 3/08; G06N 3/045; G06F 40/40
See application file for complete search history.

(56) References Cited

U.S. PATENT DOCUMENTS

| | | | | |
|---|---|---|---|---|
| 8,838,970 B1 * | 9/2014 | Suresh | .................... | H04L 63/08 713/168 |
| 9,317,715 B2 ‡ | 4/2016 | Schuette | ............. | G06F 21/6254 |
| 9,342,675 B2 * | 5/2016 | Suresh | .................... | H04L 63/08 |

(Continued)

FOREIGN PATENT DOCUMENTS

IN 202541108488 A * 11/2025 ............ G06F 111/18

*Primary Examiner* — Sharon S Lynch

(57) ABSTRACT

Systems and methods are disclosed for epistemic engineering and scalable certification of reasoning durability using artificial intelligence mediated interrogation grounded in a bounded semantic domain. An Epistemic Learning Object (ELO) organizes domain knowledge through a hierarchical epistemic table-of-contents linked to competencies, content resources, and governance attributes. A Deep Semantic Compilation process transforms the ELO into a Semantic Latent Layer that constrains artificial intelligence reasoning through truth-constrained pedagogical semantic grounding. A Learning Gym conducts Socratic reasoning training and records reasoning exposure events, generating an Experience Credential that summarizes governed reasoning exposure while excluding learner responses and personal identity information. An independent Certification Arena performs adversarial interrogation derived from the Experience Credential and the bounded semantic domain to verify reasoning durability. Epistemic artifacts including reasoning challenges, shared experience assets, and annotations may be registered, metered, and attributed through registries and distributed ledgers supporting an epistemic engineering economy.

3 Claims, 15 Drawing Sheets

Certification Governance Architecture (CGA)

Related U.S. Application Data

19/315,444, filed on Aug. 29, 2025, now Pat. No. 12,556,907.

(56) References Cited

U.S. PATENT DOCUMENTS

| | | | | |
|---|---|---|---|---|
| 10,467,919 | B2 * | 11/2019 | Fuka | G09B 7/02 |
| 10,560,274 | B2 * | 2/2020 | Camenisch | H04L 63/0823 |
| 10,853,515 | B2 ‡ | 12/2020 | Whitcomb | G16H 10/60 |
| 10,891,360 | B2 * | 1/2021 | Nygate | G06F 16/2455 |
| 11,042,885 | B2 * | 6/2021 | Mercury | G06Q 30/018 |
| 11,057,382 | B2 ‡ | 7/2021 | Allen | H04L 63/10 |
| 11,107,363 | B2 * | 8/2021 | Morris | G06F 16/24578 |
| 11,250,157 | B2 ‡ | 2/2022 | Apsingekar | H04L 9/0825 |
| 11,341,508 | B2 * | 5/2022 | Mercury | G06Q 30/018 |
| 11,423,131 | B2 * | 8/2022 | Nygate | G06F 16/2455 |
| 11,646,888 | B2 ‡ | 5/2023 | Apsingekar | H04L 9/0891 713/159 |
| 11,657,181 | B2 ‡ | 5/2023 | Apsingekar | H04L 9/3213 726/26 |
| 11,829,513 | B2 ‡ | 11/2023 | Apsingekar | H04W 12/02 |
| 11,831,776 | B2 ‡ | 11/2023 | Apsingekar | G06F 21/6245 |
| 11,915,614 | B2 * | 2/2024 | Agley | G11B 27/34 |
| 11,954,230 | B2 ‡ | 4/2024 | Apsingekar | H04L 9/0827 |
| 11,983,723 | B2 * | 5/2024 | Mercury | G06Q 30/018 |
| 11,995,210 | B2 ‡ | 5/2024 | Beye | G06F 21/602 |
| 12,277,249 | B2 ‡ | 4/2025 | Apsingekar | H04L 9/088 |
| 12,282,580 | B2 ‡ | 4/2025 | Ciampaglia | G06F 21/602 |
| 12,417,310 | B2 ‡ | 9/2025 | Andrews | G06F 21/602 |
| 12,651,267 | B2 * | 6/2026 | Mercury | G06Q 30/018 |
| 2006/0075228 | A1 ‡ | 4/2006 | Black | H04L 63/104 713/167 |
| 2009/0168995 | A1 ‡ | 7/2009 | Banga | G06F 16/958 707/999.01 |
| 2014/0059355 | A1 ‡ | 2/2014 | Schuette | G06F 21/6218 713/189 |
| 2014/0351914 | A1 * | 11/2014 | Suresh | G06F 21/32 726/7 |
| 2015/0206441 | A1 * | 7/2015 | Brown | G06Q 50/2053 434/319 |
| 2016/0065558 | A1 * | 3/2016 | Suresh | G06F 21/32 726/7 |
| 2016/0192194 | A1 ‡ | 6/2016 | Yang | H04W 12/082 713/171 |
| 2016/0342811 | A1 ‡ | 11/2016 | Whitcomb | G06F 16/245 |
| 2017/0359184 | A1 * | 12/2017 | Camenisch | H04L 63/0823 |
| 2018/0096619 | A1 * | 4/2018 | Fuka | G09B 7/02 |
| 2018/0261118 | A1 * | 9/2018 | Morris | G09B 5/12 |
| 2020/0136824 | A1 ‡ | 4/2020 | Allen | H04L 9/30 |
| 2020/0137058 | A1 ‡ | 4/2020 | Allen | H04L 63/0815 |
| 2021/0056186 | A1 * | 2/2021 | Nygate | G06F 16/2455 |
| 2021/0176054 | A1 ‡ | 6/2021 | Zabar | H04L 9/0894 |
| 2021/0279361 | A1 ‡ | 9/2021 | Apsingekar | H04L 9/088 |
| 2022/0067735 | A1 ‡ | 3/2022 | Tinnon | H04L 9/3213 |
| 2022/0156405 | A1 ‡ | 5/2022 | Apsingekar | H04L 9/088 |
| 2023/0088657 | A1 ‡ | 3/2023 | Ciampaglia | G06F 21/6245 726/26 |
| 2023/0105171 | A1 ‡ | 4/2023 | Beye | G06F 21/6254 713/193 |
| 2023/0252188 | A1 ‡ | 8/2023 | Apsingekar | H04L 9/3213 726/26 |
| 2025/0021982 | A1 * | 1/2025 | Devaraj | G06Q 20/4016 |
| 2025/0039004 | A1 * | 1/2025 | Razavi | G06N 3/0475 |
| 2025/0077704 | A1 ‡ | 3/2025 | Apsingekar | H04L 9/0827 |
| 2025/0245378 | A1 ‡ | 7/2025 | Andrews | G06F 21/602 |

* cited by examiner
‡ imported from a related application

SELF-SOVEREIGN DEVICE Embodiment 3

High-level Flow

ELO Node Illustrative Schema

| | | | | |
|---|---|---|---|---|
| Foundations of Clinical Reasoning 2-node sample Table of Contents > | | | Module 1: The Cognitive Science of Medicine | |
| | | | 1.1 Theories of Medical Decision-Making | |
| | | | Dual Process Theory | Mental Models |
| Tree 4: Semantic Latent Layer (SLL): Deep Semantic Compiler | | | | |
| Tree 3 decorated Table of Contents (ToC) | ToC Node Parameters | Node ID | 1.1.1 | 1.1.2 |
| | | MinML_gate | 0.9 | 0.85 |
| | | Coverage | 1.0 | 0.9 |
| | | Remediation | 5 | 3 |
| | | **RankUp** | **1** | **2** |
| | | Hierarchy Proximity | x Siblings, y Ancestors | 5x, -2y |
| | | Bloom Level | 2 | 3 |
| | | ML | 1 | 2 |
| | | Grading wt | 1 | 1 |
| | Assessments & Question Banks | Method | Script Concordance Testing (SCT) | |
| | | Definition | Measures how a student's "illness scripts" align with expert panels in uncertain scenarios. | |
| | | QB_1 | QS [1,2,3] | QS [4,5] |
| | Annotations | Contributor Authority | author: 1.3; instructor: 1.2; peer: 1.15, other: 1.05 | |
| | | Endorser Multiplier | author: 1.45; instructor: 1.35; peer: 1.1, other: 1.0 | |
| | Practices | Projects | Unit, Cross-Unit, Capstone Projects | |
| | | RC examples | The Intuition Trap: Student must override a System 1 error. | Model Collision: Reconciling two conflicting physiological models. |
| Tree 2 Competencies & Learning Objectives | Learning Objectives | | Differentiate between System 1 and System 2 thinking and describe the role of each in the diagnostic process. | |
| | Competency | | Critical Thinking | |
| | Link | | https://mppacademy.org/aamc-competencies/ | |
| | Definition | | Using logic and reasoning to identify strengths and weaknesses of alternative solutions. | |
| Tree 1 Truth Anchor & Content | **Ontology** *(weight: 1.0)* (SNOWMED CT) | Concept | Cognitive Process (MF) | Mental Representation (MF) |
| | | Mapping | cognitive process | mental representation |
| | | Notes | Core class | Good match |
| | | IRI | http://purl.obolibrary.org/obo/MF_0000008 | http://purl.obolibrary.org/obo/MF_0000030 |
| | **SEA** | *weight: 0.98* | Community-Acquired Pneumonia Illness Script | |
| | **Lecture Notes** | *weight: 0.94* | Week 2 | Week 3 |
| | **Textbook** | *weight: 0.85* | Clinical Reasoning in the Health Professions, ISBN: 0443110972 | |
| | **Micro video** | *weight: 0.50* | An Introductin to Clinical Reasoning, @Strong Medicine | |

FIG. 11

Reasoning Challenge (RC) Example: Chest Pain Under Uncertainty

Top-Level Metadata

| Field | Value |
|---|---|
| challenge id | CHAL.CHEST PAIN UNCERTAINTY |
| title | Chest Pain Under Uncertainty |
| version | 1.0.0 |
| *domain tags* | *medical clinical reasoning, diagnostic reasoning* |
| description | A family of chest pain scenarios featuring incomplete and evolving |
| Integrity | Hash, signature |
| Governance | Clinical Reasoning |
| Prohibited | Leaner identity, performance scores, answer keys, scoring rubrics, |

Scenario Envelope

| Field | Value |
|---|---|
| presenting complaint family | chest pain |
| uncertainty features | incomplete history evolving symptoms conflicting risk factors |
| allowable evidence types | history physical exam basic tests follow up info |
| progressive disclosure | TRUE |
| allow ambiguous findings | TRUE |
| require assumption tracking | TRUE |

Required Reasoning Dimensions

PROBE.HYPOTHESIS GENERATION
PROBE.DIFFERENTIAL DIAGNOSIS
PROBE.EVIDENCE WEIGHTING
PROBE.UNCERTAINTY MANAGEMENT
PROBE.ASSUMPTION TRACKING
PROBE.HYPOTHESIS REVISION

Counterfactual Templates

| Template ID | Description | Knobs |
|---|---|---|
| CF.RISK FACTOR INVERSION | Invert or remove a key risk factor to test robustness of the reasoning strategy. | risk factor presence, risk factor strength |
| CF.TEST RESULT CONTRADICTION | Introduce a test finding that conflicts with the learner's leading hypothesis. | evidence type, contradiction severity |

Constraint Set

| Constraint ID | Description | Parameters |
|---|---|---|
| C.TIME PRESSURE | Impose time pressure requiring prioritization and explanation of tradeoffs. | max minutes: 7 |
| C.LIMITED TESTS | Limit number of tests that may be requested to force evidence weighting. | max tests: 2 |

FIG. 12

Experience Credential (EC) Illustrative Schema

Headers

1 Course metadata: course id, seriesNo, minML, maxRemediation, minCoverage
2 Issuance: device_id, target_arena, expiration_date, GMT_id, id_for_audits
3 Governed versions: probe taxonomy, constraint taxonomy.
4 Integrity: EC hash and crypto signature
5 Gym-Cert Data
6 Exclusions: learner identity, learner raw data

Body

1 For each Reasoning Challenge RC
    RC id, RC hash,
    For each Scenario:
        Scenario hash
        Scenario Probe Space
        Scenario Constraints
        Scenario Perturbations
2 Gym-Cert Data
    Reasoning Integrity: running hash last value
    Engine Freshness: last Bot-learner audit <= 24 hours
    System Integrity: Gym engines audit attestation hash
    Safety Seal: governance violation log
3 Rollups
    Scenario hashes
    Bucketed counts
        PROBE.COUNTERFACTUAL_REASONING: 3 times
        CONSTRAINT.TIME PRESSURE: 9 times
4 Admissible probe space
    HYPOTHESIS_GENERATION, COUNTERFACTUAL_REASONING,
    DIFFERENTIAL_DIAGNOSIS, ASSUMPTION_TRACKING,
    EVIDENCE_WEIGHTING, HYPOTHESIS_REVISION
    UNCERTAINTY_MANAGEMENT,
5 Admissible Constraints
    INFO_LIMIT, CONFLICTING_EVIDENCE,
    TIME_PRESSURE, COUNTERFACTUAL
6 Admissible Perturbations
    age_shift, symptom_overlap

FIG. 13

SSS Cohort Payload Example

Batch upload min cohort size, K > 30
delayed upload: true

Exclusions learner_identity, learner_responses, free_text, dialog_transcripts, raw telemetry, certification outcomes

Integrity hash_alg: SHA-256; hash: ...
signature_alg: ED25519; signature: ...

Governance Compliance Log

Gym-Cert-Data
Governance compliance violations[]

Cohort Analytics

Challenge Family

| *Challenge* | *Count* |
| --- | --- |
| CHAL.CHEST_PAIN UNCERTAINTY | 41 |
| CHAL.CONFLICTING_EVIDENCE | 36 |

Probe Dimension Coverage (Bucketed %)

| *Probe Dimension* | *Coverage Band* |
| --- | --- |
| PROBE.HYPOTHESIS GENERATION | 80–90% |
| PROBE.EVIDENCE_WEIGHTING | 70–80% |

Constraint Class Exposure (Bucketed %)

| *Constraint Class* | *Exposure Band* |
| --- | --- |
| CONSTRAINT.PROGRESSIVE DISCLOSURE | 80–90% |

Duration Histogram

| *Bucket* | *Count* |
| --- | --- |
| 0–1h | 8 |
| 1–3h | 24 |

Remediation Depth Histogram

| *Bucket* | *Count* |
| --- | --- |
| 0–1 | 22 |
| 2–3 | 49 |

Friction Signals

| *Signal* | *Value* |
| --- | --- |
| escalation_rate | 10–15% |
| abandonment_rate | 0–5% |

FIG. 14

Shared Experience Asset (SEA) Example

Curated, reusable teaching and practice assets distilled from instructional experience. Not learner-specific telemetry.

| | ASSET > Field | Asset 1 — SEA HEURISTIC .RED_FLAGS CHEST_PAIN Value | Asset 2 — SEA TEMPLATE .ASSUMPTION TRACKING_NOTE Value |
|---|---|---|---|
| | asset id | SEA. HEURISTIC. RED_FLAGS_CHEST_PAIN | SEA.TEMPLATE.ASSUMPTION TRACKING_NOTE |
| | asset type | checklist | template |
| | asset types | checklist ¦ template ¦ pattern ¦ prompt ¦ exemplar ¦ heuristic ¦ script | |
| | title | Chest Pain Red-Flag Checklist (Reasoning Aid) | Assumption Tracking Template (Mini Note) |
| | description | A checklist of red-flag considerations used to prompt systematic reasoning, without prescribing a single diagnosis. | A template that encourages explicit listing of assumptions, triggers for revision, and uncertainty statements. |
| actual content | ref type | content_addressed_blob | content_addressed_blob |
| | hash alg | SHA-256 | SHA-256 |
| | hash | ILLUSTRATIVE_BLOB_HASH1 | ILLUSTRATIVE_BLOB_HASH2 |
| | tags | chest_pain uncertainty systematic_reasoning | assumptions reflection documentation |
| applicability | challenge classes | CHAL. CHEST_PAIN UNCERTAINTY | CHAL. CHEST_PAIN_UNCERTAINTY, CONFLICTING_EVIDENCE |
| | probe dimensions | PROBE. EVIDENCE_WEIGHTING, UNCERTAINTY_MANAGEMENT | PROBE. ASSUMPTION_TRACKING, HYPOTHESIS_REVISION |
| provenance | author | FAC-ANON-12, FAC-ANON-44 | FAC-ANON-21 |
| | reviewer | FAC-ANON-07 | FAC-ANON-07 |
| | approval | approved | approved |
| | approved | 2/11/2026 | 2/11/2026 |
| lifecycle | version | 1.0.0 | 1.0.0 |
| | supersedes | null | null |
| | deprecated | FALSE | FALSE |

FIG. 15

SYSTEMS AND METHODS FOR EPISTEMIC ENGINEERING AND SCALABLE CERTIFICATION OF REASONING DURABILITY USING AI-MEDIATED TRUTH-CONSTRAINED PEDAGOGICAL SEMANTIC GROUNDING

CROSS-REFERENCE TO RELATED APPLICATIONS

This application is a continuation-in-part of U.S. patent application Ser. No. 19/463,664 filed Jan. 29, 2026, which is a continuation-in-part of U.S. patent application Ser. No. 19/452,170 filed Jan. 16, 2026, which is a continuation-in-part of U.S. patent application Ser. No. 19/447,052 filed Jan. 12, 2026, which is a continuation-in-part of U.S. patent application Ser. No. 19/334,453, filed Sep. 19, 2025, which is a continuation-in-part of U.S. patent application Ser. No. 19/315,444, filed Aug. 29, 2025, the disclosures of which are incorporated herein by reference in their entirety.

This application also claims the provisional patent application No. 64/005,742 filed on Mar. 14, 2026, the disclosure of which is incorporated herein by reference in their entirety.

FEDERALLY SPONSORED RESEARCH AND DEVELOPMENT

Not Applicable

REFERENCE TO A “SEQUENCE LISTING”, A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

Not Applicable.

REFERENCES CITED

None.

FIELD OF THE INVENTION

The present disclosure relates generally to artificial-intelligence-mediated reasoning systems, certification governance architectures, and epistemic engineering frameworks for capturing, structuring, and evaluating reasoning knowledge.

More particularly, the disclosure relates to systems and methods for constructing epistemic learning objects, compiling bounded semantic knowledge domains for artificial intelligence systems, generating adversarial reasoning interrogations, and governing certification processes that verify reasoning durability independently of training environments.

The disclosure further relates to systems and methods for operating an epistemic engineering economy that captures tacit expertise as structured machine-consumable artifacts and distributes compensation based on measured epistemic impact.

BACKGROUND OF THE INVENTION

Modern professional certification systems primarily evaluate knowledge recall or procedural familiarity rather than durable reasoning capability. Traditional examination models rely heavily on multiple-choice testing and fixed question banks, which often measure memorization rather than adaptive reasoning.

At the same time, artificial intelligence systems are increasingly used in educational environments to assist learners, generate explanations, and provide adaptive guidance. However, most existing artificial intelligence systems operate using open-domain reasoning models that are not constrained to a formally defined domain knowledge structure. As a result, such systems may generate responses outside the intended conceptual scope, produce explanations that are not grounded in authoritative domain knowledge, or hallucinate what may be presented as facts.

Existing educational technologies also fail to capture and formalize the tacit reasoning expertise of instructors and domain experts. Much of the knowledge used to train learners-such as diagnostic reasoning patterns, experiential insights, and real-world challenge scenarios-remains embedded in human practice rather than structured into machine-readable artifacts that can be reused across learning and certification environments.

Furthermore, current certification systems typically integrate training and evaluation within the same institutional structures. This coupling creates governance challenges, including conflicts of interest between instructional institutions and certification authorities, and makes it difficult to independently verify the reasoning capabilities of learners trained within a particular system.

Another challenge arises in measuring the impact of expert-generated learning artifacts. Existing ecosystems lack mechanisms for systematically tracking the usage and influence of knowledge contributions across independent evaluation environments. Consequently, domain experts who contribute valuable reasoning artifacts often receive little recognition or compensation for their contributions.

Accordingly, there exists a need for improved systems and methods that:

1) capture tacit reasoning expertise as structured machine-consumable artifacts;
2) constrain artificial-intelligence reasoning systems to operate within bounded epistemic domains derived from authoritative domain structures;
3) separate training environments from independent certification environments capable of adversarial reasoning evaluation; and
4) measure and reward the impact of knowledge contributions within a distributed epistemic engineering ecosystem.

SUMMARY OF THE INVENTION

The present disclosure describes systems and methods for epistemic engineering, bounded artificial-intelligence reasoning, and governed certification of reasoning durability. The disclosed architecture establishes a knowledge protocol infrastructure that converts tacit human expertise into structured machine-consumable epistemic artifacts enabling scalable certification of reasoning durability.

In one aspect, the disclosure describes an epistemic engineering framework for structuring domain knowledge into machine-consumable artifacts. Domain knowledge may be organized through epistemic learning objects that define hierarchical conceptual structures linking domain content, competencies, reasoning challenges, and semantic constraints. These structures enable artificial intelligence systems to operate within bounded epistemic domains derived from curated domain knowledge.

In another aspect, the disclosure describes systems for deep semantic compilation of domain knowledge associated with epistemic learning objects. During deep semantic compilation, instructional resources, domain references, and related knowledge artifacts associated with nodes of an epistemic table-of-contents are ingested and transformed into a semantic latent layer representing a bounded domain knowledge space. Artificial intelligence reasoning systems operating within this semantic latent layer may retrieve knowledge, generate reasoning prompts, and conduct interrogations while remaining constrained to the defined epistemic domain.

In another aspect, the disclosure describes truth-constrained pedagogical semantic grounding mechanisms for artificial intelligence reasoning systems. These mechanisms retrieve candidate knowledge from the semantic latent layer, validate the retrieved knowledge against truth anchors and domain references, and apply pedagogical re-ranking processes using node attributes such as semantic weighting parameters and annotation authority signals. The resulting reasoning prompts are therefore grounded in both authoritative domain knowledge and pedagogical intent.

In another aspect, the disclosure describes learning gym environments that conduct experiential reasoning training. Within such environments, learners engage in Socratic dialog with artificial intelligence agents and are presented with reasoning challenges designed to simulate real-world problem-solving scenarios. The learning gym records reasoning exposure events describing the reasoning environments encountered during training.

In another aspect, the disclosure describes experience credentials generated by learning gyms. An experience credential represents a structured summary of reasoning exposure obtained during training while excluding learner responses and personally identifiable information. Experience credentials may be transferred to independent certification environments without revealing prior training interactions.

In another aspect, the disclosure describes certification arena environments configured to perform adversarial interrogation of learners. Certification arenas may derive interrogation prompts from experience credentials and epistemic learning objects in order to evaluate reasoning durability within a defined epistemic domain. Certification outcomes may be generated independently of the training environments in which the learner acquired experience.

In another aspect, the disclosure describes governance architectures that separate learning gyms from certification arenas to ensure independent verification of reasoning durability. In certain embodiments, learner identities may be reconciled through identity provider systems, while in other embodiments certification outcomes may be recorded through distributed ledger systems.

In another aspect, the disclosure describes an epistemic engineering economy in which tacit knowledge artifacts such as reasoning challenges, shared experience assets, and expert annotations are registered and distributed through artifact registries. Usage of such artifacts may be metered across independent environments, and impact metrics may be computed to quantify the influence of each artifact.

In certain embodiments, compensation associated with epistemic artifacts may be distributed according to contributor role metadata and computed impact factors, thereby enabling structured recognition and reward for knowledge contributions within the epistemic engineering ecosystem.

The systems and methods described herein therefore enable structured capture of domain expertise, bounded artificial-intelligence reasoning grounded in epistemic learning objects, and independent certification of reasoning durability within governed learning and certification environments.

BRIEF DESCRIPTION OF THE DRAWINGS

FIG. 11 illustrates an example data schema of two nodes of an epistemic learning object (ELO) eToC, the nodes decorated with various governed parameters and Trees 1-3 attributes.

FIG. 12 is an illustrative schema for a Reasoning Challenge (RC), showing required reasoning dimensions, counterfactual templates, and constraint sets.

FIG. 13 is an illustrative schema for an Experience Credential (EC), detailing headers for governed versions, integrity hashes, the exclusion of learner raw data, sample Gym-Cert-data, and exposed RC probes and definitions.

FIG. 14 is an illustrative payload for the Sanitized Semantic Stream (SSS), showing cohort-level governance telemetry and mandatory privacy exclusions.

FIG. 15 is an illustrative example of a Shared Experience Asset (SEA), detailing asset types, provenance, and applicability probes for faculty-authored reasoning aids.

Figure 1:
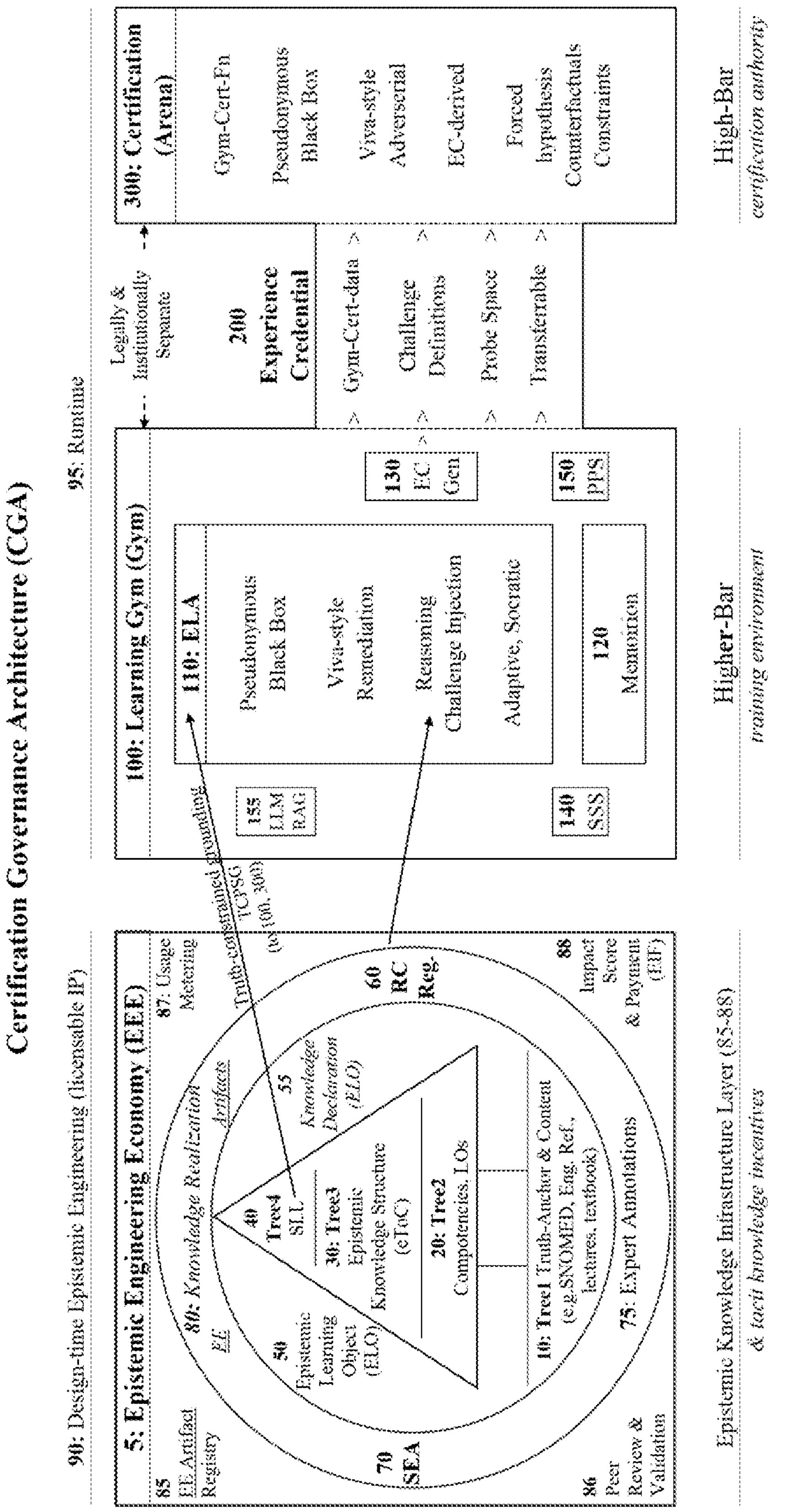
FIG. 1 illustrates an example architecture of an epistemic learning ecosystem including epistemic learning objects, semantic compilation processes, and artificial intelligence reasoning components.
Figure 2:
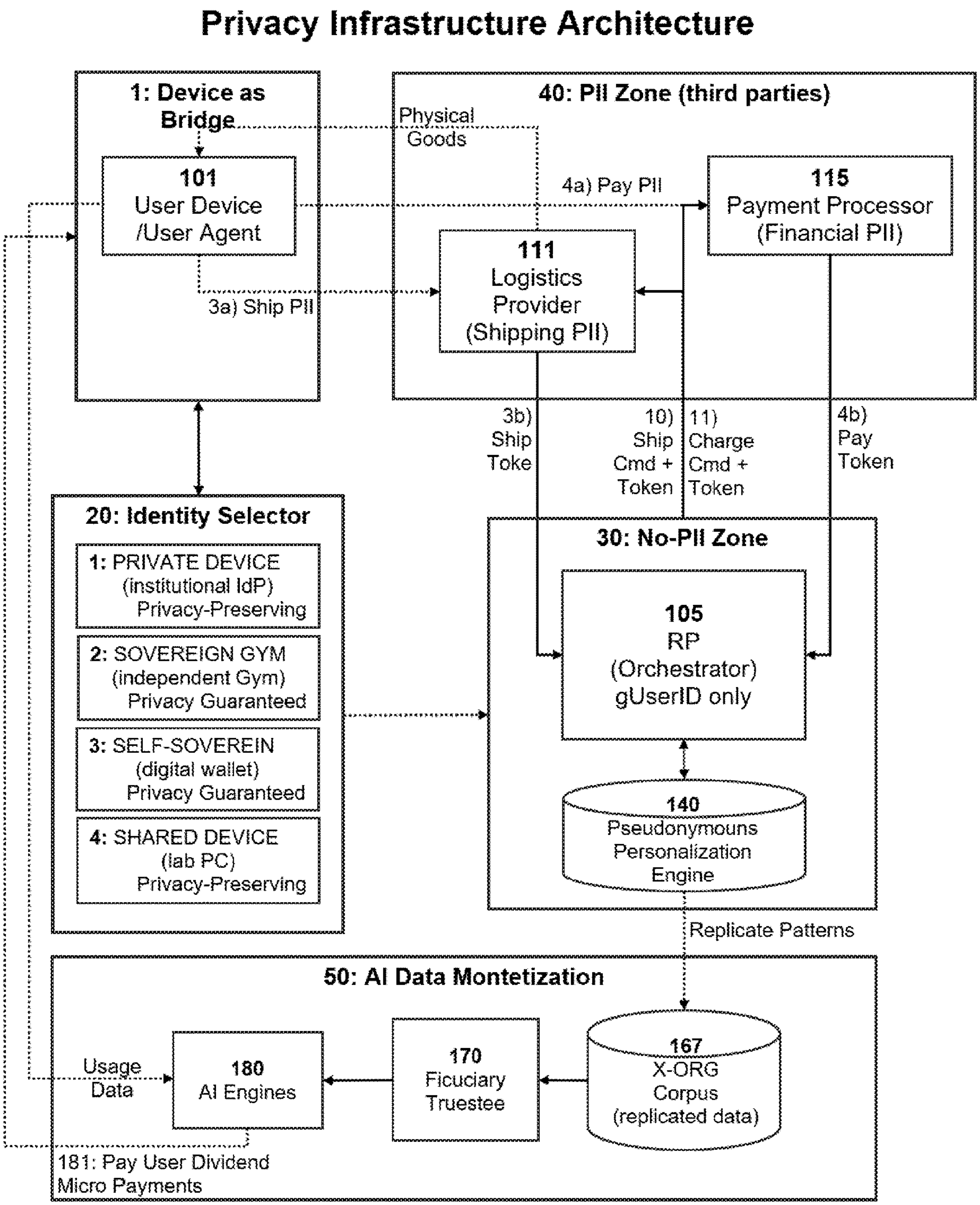
FIG. 2 illustrates an identity architecture including an identity selector and identity provider configurations enabling privacy-preserving and privacy-guaranteed embodiments.
Figure 3:
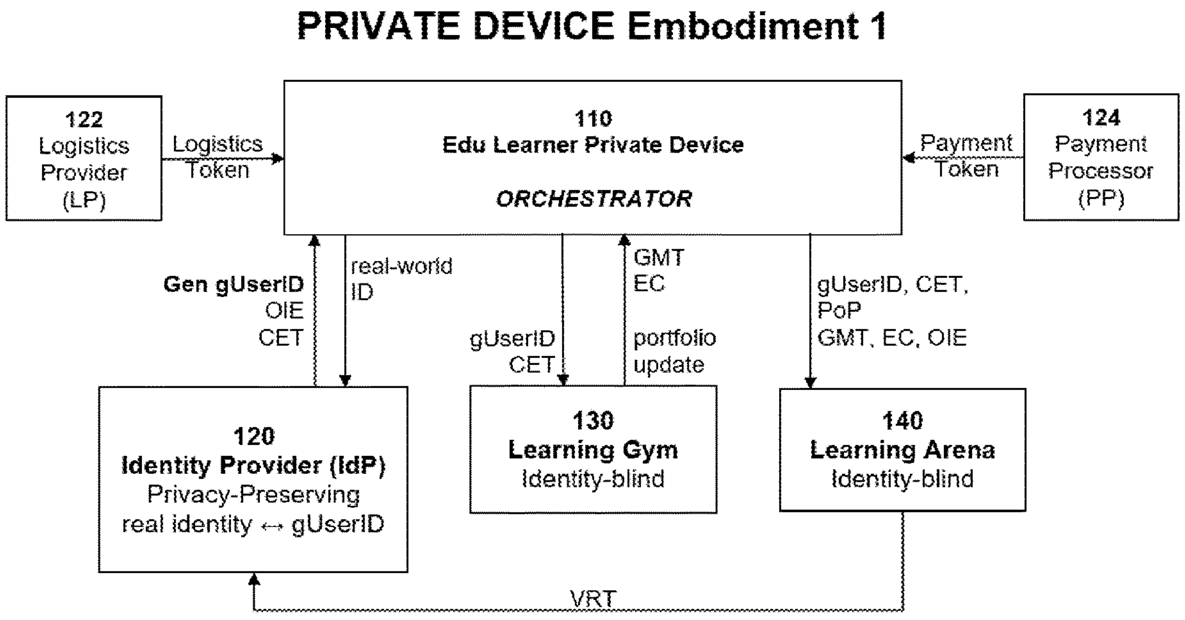
FIG. 3 is a block diagram of Embodiment 1, illustrating an institutional deployment where a Private Learner Device (110) acts as the trust orchestrator bridging an Identity Provider (120) with identity-blind runtime entities.
Figure 4:
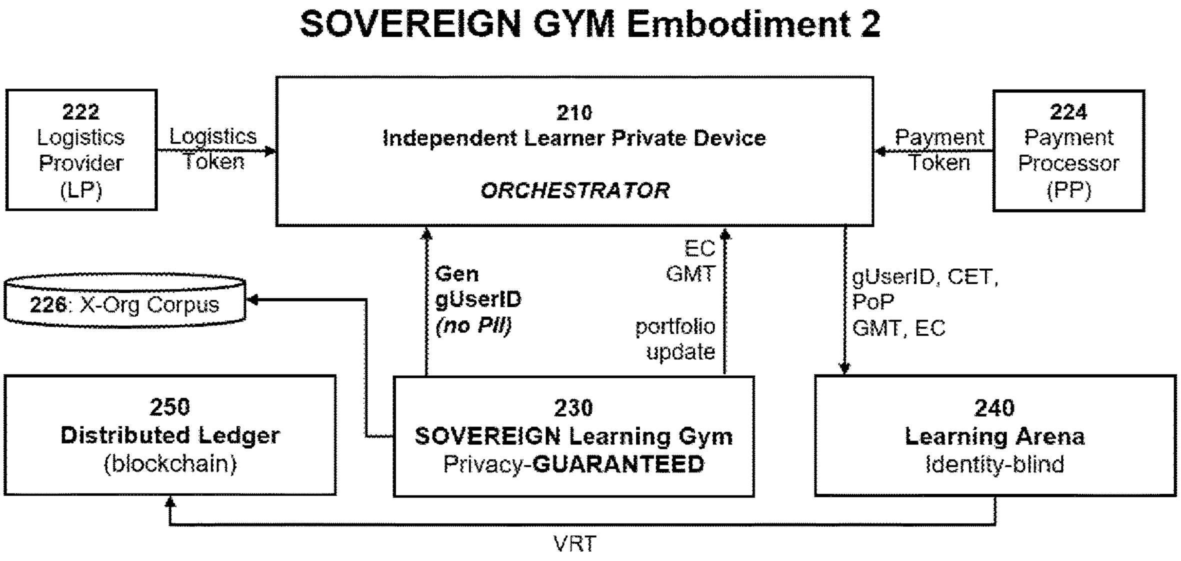
FIG. 4 is a block diagram of Embodiment 2, illustrating a Sovereign Gym deployment where privacy is guaranteed through Gym-generated local identifier and a Distributed Ledger (250) settlement for verification results.
Figure 5:
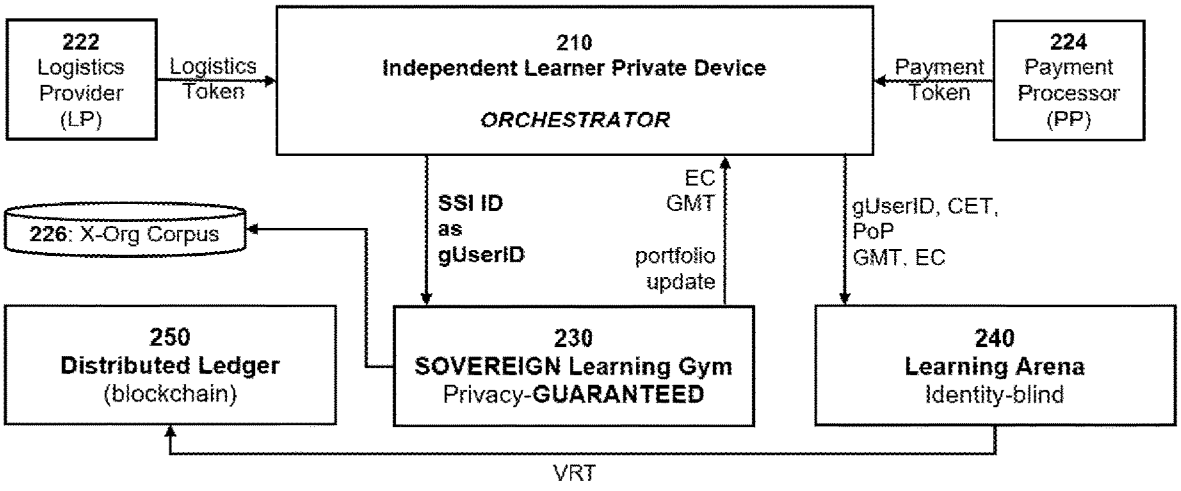
FIG. 5 is a block diagram of Embodiment 3, illustrating the second privacy-guaranteed setup that is identical to FIG. 4 except that the learner brings her/his Self-Sovereign pseudonymous ID.
Figure 6:
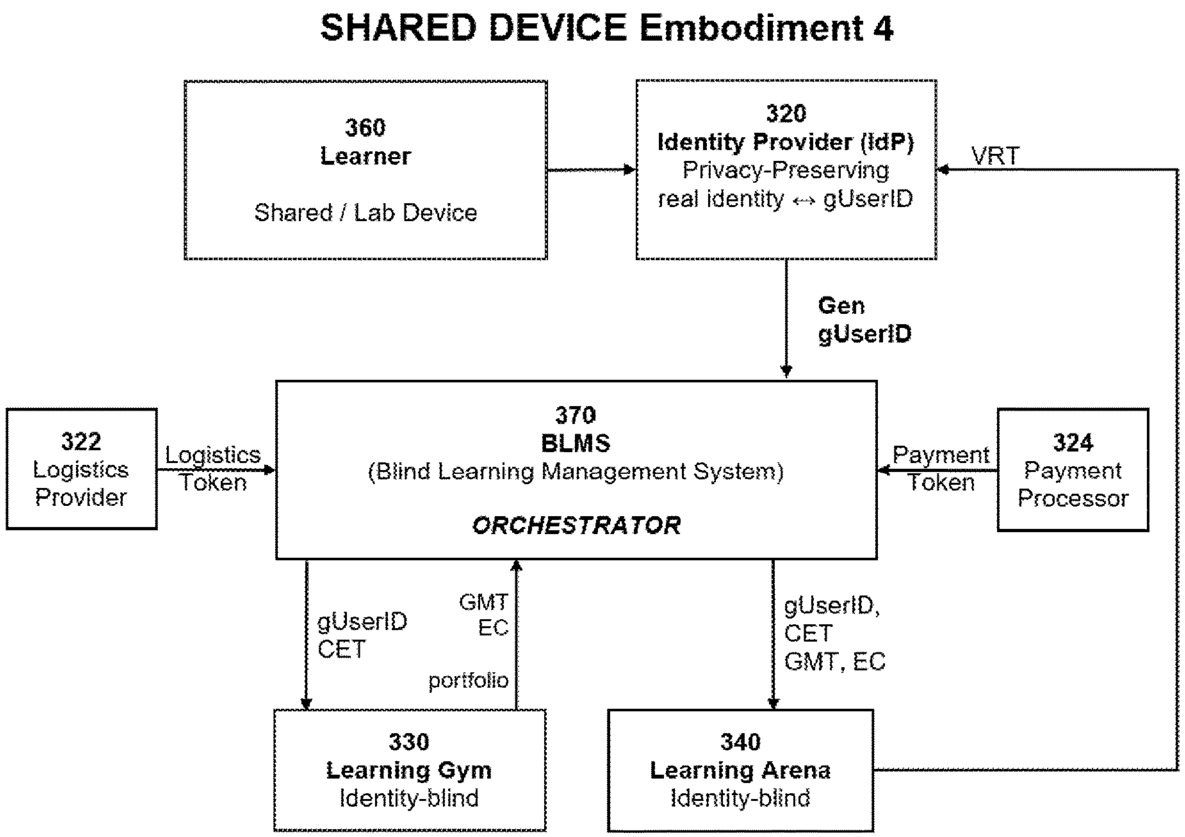
FIG. 6 is a block diagram of Embodiment 4, illustrating a Shared Device deployment where a Blind Learning Management System (BLMS) (370) acts as the identity-blind orchestrator and credential custodian.
Figure 7:
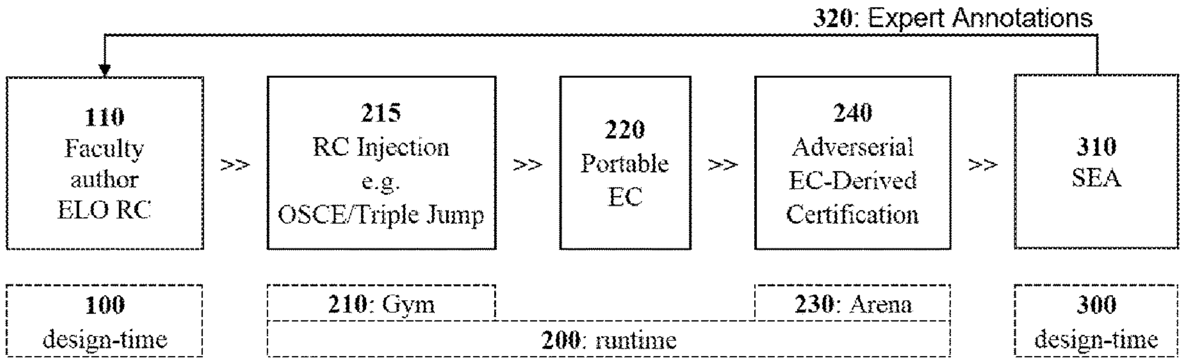
FIG. 7 is a high-level process flow diagram illustrating a self-reinforcing epistemic feedback loop starting with epistemic artifact authoring (110) of objects used in the learning Gym, connected to the Arena via EC, and ending with tacit engineering capture in Shared Experience Assets (310) and Expert Annotations (320), which are reflected back in the Epistemic authoring process (110).

In certain embodiments, the components described herein may operate independently or in combination. For example, epistemic artifact registries and impact measurement mechanisms may operate as standalone knowledge infrastructure independent of certification environments. Similarly, bounded artificial intelligence reasoning systems derived from epistemic learning objects may be deployed within learning environments, certification environments, or other reasoning systems. Certification governance architectures separating training environments from certification arenas may likewise operate with or without the artifact economy or semantic compilation mechanisms described herein. Accordingly, the architectural components described in the present disclosure may be implemented as integrated systems or as independent subsystems.

DETAILED DESCRIPTION OF THE INVENTION

The following description presents example embodiments of the systems and methods described herein. The drawings illustrate architectural components, data structures, and operational processes associated with epistemic engineering, artificial-intelligence-mediated reasoning, and governed certification environments. The described embodiments are provided for illustrative purposes and do not limit the scope of the claims.

DEFINITIONS

The following definitions describe terms used throughout the present disclosure. These definitions are provided for clarity and do not limit the scope of the claims. Example token-related routings are illustrated in Tables 1-3 in the "Reference Lists and Tables" section at the end of Detailed Description.

1. Certification Governance Architecture (CGA)

The Certification Governance Architecture defines structural rules governing operation of Learning Gyms, Certification Arenas, identity services, third-party services, and supporting infrastructure. The CGA enforces separation between identity management, training environments, and certification authorities.

2. Certification Governance Specification (CGS)

The Certification Governance Specification (CGS) defines a set of interoperable governance rules, data structures, and operational protocols used to ensure consistent operation of learning gyms, certification arenas, registries, and associated epistemic engineering infrastructure.

The CGS specifies structures and policies governing Epistemic Learning Objects (ELOs), reasoning challenge definitions, experience credentials, artifact registries, provenance ledgers, and associated governance parameters. These structures enable independent organizations to operate interoperable training, certification, and knowledge contribution systems while maintaining consistent verification standards.

In certain implementations, the CGS defines schema structures and metadata attributes used for Epistemic Table of Contents (eToC) nodes, knowledge realization artifacts including Reasoning Challenges (RC), Shared Experience Assets (SEA), and expert annotations, as well as credential structures including Experience Credentials (EC). The CGS may further define registry interfaces, artifact attribution metadata, and governance rules for artifact metering, provenance recording, and compensation distribution within an Epistemic Engineering Economy.

The CGS thereby provides a governance framework enabling multiple independent organizations to implement interoperable learning gyms, certification arenas, and artifact registries while preserving certification integrity, attribution transparency, and verification consistency.

In certain implementations, compliance with the CGS enables artifacts, credentials, and governance records generated by one organization to be recognized, verified, and consumed by other organizations participating in the certification ecosystem.

3. Epistemic Engineering (EE)

A discipline for constructing structured knowledge environments that enable machines and humans to perform reasoning tasks grounded in verified domain knowledge.

Epistemic Engineering may include the creation of hierarchical knowledge structures, reasoning challenges, semantic compilation processes, and annotation frameworks used to guide reasoning training and certification.

4. Epistemic Engineering Economy (EEE)

A distributed incentive infrastructure supporting creation, validation, attribution, and metered usage of epistemic artifacts including reasoning challenges, shared experience assets, and annotations.

5. Epistemic Impact Factor (EIF)

An immutable ledger-recorded metric representing measured contribution impact of an epistemic engineering artifact, derived from metered usage and one or more weighting factors.

6. Epistemic Learning Object (ELO)

An Epistemic Learning Object is a structured representation of a domain knowledge environment. The ELO provides the conceptual scope within which reasoning challenges and certification interrogations operate. An ELO may include a hierarchical conceptual structure comprising:

- a Truth Anchor layer
- competency definitions and learning objectives
- an Epistemic Table of Contents (eToC)
- content sources associated with nodes of the eToC that are subject to Deep Semantic Compilation.

7. Truth Anchor

A Truth Anchor is a knowledge constraint layer comprising one or more reference sources designated to bound or constrain reasoning operations performed by artificial intelligence reasoning systems.

8. Epistemic Table of Contents (eToC)

The Epistemic Table of Contents (eToC) is a hierarchical knowledge structure within an Epistemic Learning Object representing the conceptual organization of a domain.

Any eToC node may be decorated with metadata attributes which get inherited by default by descendants unless overridden. Attributes assigned at the root level apply to the entire ELO.

The eToC further functions as an operational coordination structure for runtime reasoning systems. In particular, the node-level links and metadata enable artificial intelligence reasoning systems to retrieve, constrain, rank, and generate reasoning prompts within the bounded semantic domain defined by the Epistemic Learning Object.

Examples of links associated with an eToC node:
1. Truth Anchor links:
   a. Ontologies
   b. Standards references
2. Actual content links:
   a. Lecture notes
   b. Textbooks
   c. Other resources
3. Knowledge Realization registry links
   a. Reasoning Challenges (RC)
   b. Shared Experience Assets (SEA)
   c. Expert Annotations (Anns)
4. Metadata:
   a. Deep Semantic Compilation parameters:
      i. RankUp
      ii. Hierarchy proximity
   b. Pedagogy/Adaptive:
      i. Competencies
      ii. Learning objectives
      iii. Bloom Level
      iv. Actual mastery/difficulty level
      v. Relative grading weight
   c. Governance:
      i. Minimum Mastery Level gate
      ii. Minimum coverage percent
      iii. Number of remediation attempts within the unit
5. Assessments: traditional question banks, Domain-specific
6. Practices: RCs, Unit level, Cross-unit, Capstone projects.

In certain embodiments, one or more node-level semantic weighting parameters may be defined to influence retrieval, ranking, or reasoning prompt generation within the semantic latent layer. Such parameters allow human domain experts and/or system designers to selectively emphasize particular conceptual nodes or relationships within the epistemic knowledge structure. Thus, node-level semantic weighting influences reasoning behavior.

The eToC thereby serves as a unified coordination structure linking domain knowledge, pedagogical objectives, governance constraints, and experiential reasoning artifacts.

9. Deep Semantic Compilation (DSC)

Deep Semantic Compilation refers to a process in which content sources associated with nodes of the epistemic knowledge structure, including deeply referenced resources, are ingested and transformed into a unified semantic domain representation.

During compilation, semantic representations of the content are structurally associated with corresponding nodes of the epistemic knowledge structure and constrained by rule-based parameters (e.g., weighting) and domain constraints derived from the truth anchor layer.

The compilation process thereby produces a Semantic Latent Layer (SLL) that defines a bounded domain of knowledge available to AI reasoning processes.

10. Semantic Latent Layer (SLL)

The Semantic Latent Layer is a semantic representation derived from Deep Semantic Compilation. It constrains reasoning agents to operate within the semantic boundaries defined by the Epistemic Learning Object.

The Semantic Latent Layer maintains semantic associations between compiled content representations and the nodes of the epistemic knowledge structure, enabling reasoning systems to retrieve and rank knowledge in relation to conceptual structure rather than merely by textual similarity.

The semantic latent layer produced through Deep Semantic Compilation thereby provides the bounded semantic domain used by artificial intelligence reasoning systems operating within both learning gym environments and certification arena environments, enabling consistent reasoning prompt generation and interrogation across training and certification phases.

In contrast to open-domain artificial intelligence systems, the semantic latent layer defines a bounded semantic domain derived from the epistemic learning object. Retrieval and reasoning prompt generation are thereby constrained to concepts, relationships, and sources associated with the epistemic knowledge structure, preventing reasoning outside the governed domain context.

11. Truth-Constrained Pedagogical Semantic Grounding (TCPSG)

Truth-Constrained Pedagogical Semantic Grounding is a reasoning grounding process used by artificial intelligence systems operating within an Epistemic Learning Object. TCPSG constrains reasoning operations by applying domain boundaries defined by the Semantic Latent Layer together with validation against the Truth Anchor layer and pedagogical re-ranking using node-level metadata associated with the Epistemic Table of Contents.

Through this process, reasoning prompts and responses generated by the artificial intelligence system remain constrained to verified domain knowledge while reflecting pedagogical objectives and semantic relationships defined within the Epistemic Learning Object.

TCPSG thereby prevents reasoning operations from producing outputs derived from sources outside the governed epistemic domain.

12. Reasoning Challenge (RC)

A Reasoning Challenge (RC) is a structured reasoning scenario designed to evaluate conceptual reasoning ability within a defined epistemic domain.

An RC may include:
- scenario variants
- reasoning probes
- domain constraints
- conceptual coverage targets Reasoning Challenges may be stored within registries accessible to Learning Gyms and Certification Arenas.

In certain implementations, a Reasoning Challenge may resemble structured multi-stage evaluation formats used in professional training and certification systems. For example, an RC may guide a learner through successive reasoning stages analogous to the stepwise reasoning demonstrated in structured clinical examinations such as the Objective Structured Clinical Examination (OSCE), or to progressive execution stages similar to a triple-jump evaluation in athletics. These analogies are provided for illustrative purposes to convey that reasoning is evaluated through sequential conceptual probes rather than through memorized answers.

13. Shared Experience Asset (SEA)

A Shared Experience Asset (SEA) is a curated pedagogical computer-readable artifact that captures tacit knowledge of domain experts in a structured form suitable for machine consumption and reuse within epistemic learning systems.

SEAs represent experiential reasoning patterns and operational knowledge that may not be explicitly codified in formal ontologies or textbooks. Examples include illness scripts, diagnostic heuristics, troubleshooting patterns, procedural checklists, decision templates, reasoning prompts, worked exemplars, and domain-specific problem-solving frameworks. In contrast to narrative instructional materials, SEAs are structured artifacts designed to be referenced programmatically by Epistemic Table of Contents (eToC) nodes and consumed by artificial intelligence reasoning systems. In certain implementations, SEAs may be represented using structured metadata, parameterized templates, reasoning prompts, decision pathways, or other machine-readable formats enabling automated retrieval, reasoning probe generation, or instructional guidance.

For example, an illness script in medical education may capture expert reasoning patterns linking presenting symptoms, contextual factors, and diagnostic hypotheses. Similarly, in engineering domains, a SEA may represent a troubleshooting checklist or diagnostic workflow used by experienced practitioners to identify system faults.

SEAs therefore function as bridges between tacit expert experience and explicit epistemic knowledge structures, enabling experiential knowledge to be incorporated into Epistemic Learning Objects and utilized by learning gyms, certification arenas, and associated artificial intelligence reasoning environments.

14. Learning Gym

A Learning Gym is an interactive training environment that provides experiential reasoning practice using Socratic dialog.

The Learning Gym may include multiple internal engines including, for example:

an Epistemic Learning Agent (ELA)
a Memoirion service
an Experience Credential generation engine
a Sanitized Semantic Stream service
a Portfolio Publishing service
an external large language model augmentation engine The Gym trains reasoning ability but does not issue certification outcomes.

15. Certification Arena

A Certification Arena is an independent evaluation environment configured to conduct adversarial interrogations to verify reasoning durability. The Arena derives interrogation prompts from Epistemic Learning Objects and associated Reasoning Challenge definitions and issues certification outcomes following evaluation.

The Certification Arena utilizes reasoning systems grounded in the semantic latent layer derived from Deep Semantic Compilation of the Epistemic Learning Object. Unlike the learning gym environment, which performs Socratic reasoning training and remediation, the certification arena operates in an adversarial verbal interrogation mode configured to verify reasoning durability using prompts derived from the experience credential and the bounded semantic domain of the Epistemic Learning Object.

The Certification Arena thereby verifies reasoning durability across reasoning challenge dimensions associated with the Epistemic Learning Object.

16. Experience Credential (EC)

An Experience Credential (EC) is a structured artifact generated by a Learning Gym environment representing a governed exposure space of reasoning challenges encountered during experiential reasoning training.

The Experience Credential includes:

reasoning challenge definitions
challenge exposure statistics
governance certification data
gym integrity attestations The Experience Credential excludes learner responses, performance scores, training interaction telemetry, and personally identifiable information.

The Experience Credential thereby enables independent reasoning verification environments to derive interrogation prompts from the recorded reasoning exposure space without requiring access to the training interactions performed within the learning gym.

The Experience Credential is securely stored and managed by an orchestrator component that coordinates interactions between the learning gym environment and the certification arena. The orchestrator preserves credential integrity and enforces governance constraints governing transmission of the credential to a named certification arena for reasoning durability verification.

In some implementations, the Experience Credential is structured as a portable verification artifact enabling transmission between independent learning gyms and certification arenas. Such portability allows experience credentials to function as interoperable verification tokens across organizational boundaries and, in certain deployments, to serve as standardized artifacts for reasoning durability verification.

The Experience Credential therefore functions as a reasoning exposure protocol artifact describing the challenge dimensions encountered during training rather than a record of learner performance.

Certification arenas utilize the exposure protocol artifact to derive independent interrogation prompts within the bounded semantic domain of the Epistemic Learning Object without requiring access to learner responses or prior training interactions.

Because the Experience Credential excludes training questions and learner responses, the certification arena derives independent interrogation prompts addressing the reasoning challenges recorded in the experience credential. The arena therefore evaluates reasoning durability using novel interrogations targeting the same reasoning challenge dimensions rather than replaying training questions or answers.

17. Graduation Mastery Token (GMT)

A Graduation Mastery Token is a token generated by a Learning Gym when a learner achieves a minimum mastery threshold defined within an Epistemic Learning Object. The GMT triggers generation of an Experience Credential.

18. Verification Result Token (VRT)

A Verification Result Token is a cryptographically protected artifact generated by a Certification Arena indicating a pass/fail certification outcome.

19. Governance Compliance Log (GCL)

A Governance Compliance Log records violations of Certification Governance Architecture parameter constraints during Learning Gym operation. The GCL may remain null when no violations occur.

20. Opaque Identity Envelope (OIE)

An Opaque Identity Envelope is an encrypted structure containing a learner's real-world identity information. The envelope passes through system components as an undecryptable payload and may be decrypted during transcript reconciliation only by the authorized identity provider that generated it.

21. Proof of Possession (PoP)

A Proof of Possession is a cryptographic signature demonstrating that a device presenting credentials is controlled by the authorized credential holder.

Architecture Overview

The systems described herein comprise three complementary architectural components.

First, an epistemic engineering framework structures domain knowledge and tacit expertise into machine-consumable artifacts. These artifacts may include reasoning challenges, shared experience assets, and expert annotations registered through artifact registries and associated with contributor metadata.

Second, artificial intelligence reasoning systems operate within bounded semantic domains generated through deep semantic compilation of epistemic learning objects. These systems retrieve knowledge from semantic latent layers and apply truth-constrained pedagogical semantic grounding processes to generate reasoning prompts and interrogations.

Third, certification governance architectures separate training environments from certification environments. Learning gym environments provide experiential reasoning training and generate experience credentials summarizing reasoning exposure. Certification arena environments independently evaluate reasoning durability using adversarial interrogation derived from epistemic learning objects and experience credentials.

Epistemic Engineering Economy

In certain embodiments, tacit knowledge contributions produced by domain experts are captured and structured as machine-consumable epistemic artifacts. Such artifacts may represent structured reasoning knowledge, experiential insights, domain-specific heuristics, or explanatory annotations associated with conceptual structures within an epistemic knowledge domain.

Examples of epistemic artifacts may include reasoning challenges, shared experience assets, and expert annotations. A reasoning challenge may represent a structured scenario or problem designed to elicit reasoning behavior within a domain. A shared experience asset may represent distilled lessons learned from prior practice or experiential knowledge. Expert annotations may provide explanatory commentary, semantic weighting signals, or pedagogical guidance associated with domain concepts.

Epistemic artifacts may be registered within artifact registries that expose programmatic interfaces enabling discovery and retrieval of artifacts by external systems. Registries may maintain metadata describing the artifacts, including contributor roles, authorship information, review status, and other provenance information.

Contributor roles associated with epistemic artifacts may include authorship roles, review roles, endorsement roles, or other contribution roles. In certain embodiments, artifacts may be jointly owned by multiple contributors, including individual domain experts and institutional participants. Metadata associated with artifacts may therefore include contributor role information used to attribute ownership rights and participation in downstream compensation.

In certain embodiments, registries may expose artifacts through programmatic interfaces allowing artificial intelligence systems, learning platforms, certification environments, or other computing systems to retrieve and utilize the artifacts during operation.

Usage of epistemic artifacts may be metered through usage events generated when artifacts are retrieved, referenced, or otherwise utilized by external systems. Usage events may be aggregated or batched and recorded in association with the artifacts. In certain embodiments, usage information may be periodically transmitted to a distributed ledger or other shared infrastructure to provide an immutable record of artifact usage.

Provenance information associated with artifacts may also be recorded on a distributed ledger. Such provenance information may include contributor role metadata, authorship identifiers, and artifact registration information. Recording provenance information on a distributed ledger enables independent verification of artifact ownership and contribution history.

In certain embodiments, an epistemic impact factor may be computed for individual artifacts. The epistemic impact factor may quantify the influence of an artifact based on usage signals generated by external systems. For example, usage signals generated by certification environments contribute to the impact score associated with an artifact.

Artifact usage signals generated within training environments are excluded from impact calculations in order to prevent artificial inflation or gaming of artifact impact scores. In contrast, usage signals generated by independent evaluation environments (e.g. Arenas) contribute to the impact score because such environments provide external validation of the artifact's effectiveness.

In certain embodiments, impact calculations may incorporate multiple factors including contributor authority signals, endorsement metadata associated with peer review or validation, usage frequency of artifacts, temporal recency of artifact usage, and breadth of adoption across independent environments. See sample formulas for the ReRank and EIF algorithms in LIST 2: Illustrative Epistemic Engineering Algorithms.

Compensation associated with epistemic artifacts may be distributed according to contributor role metadata and the computed impact factors. For example, payment distribution mechanisms may allocate compensation among artifact contributors based on role metadata stored with the artifacts and the measured epistemic impact associated with those artifacts.

Figure 8:
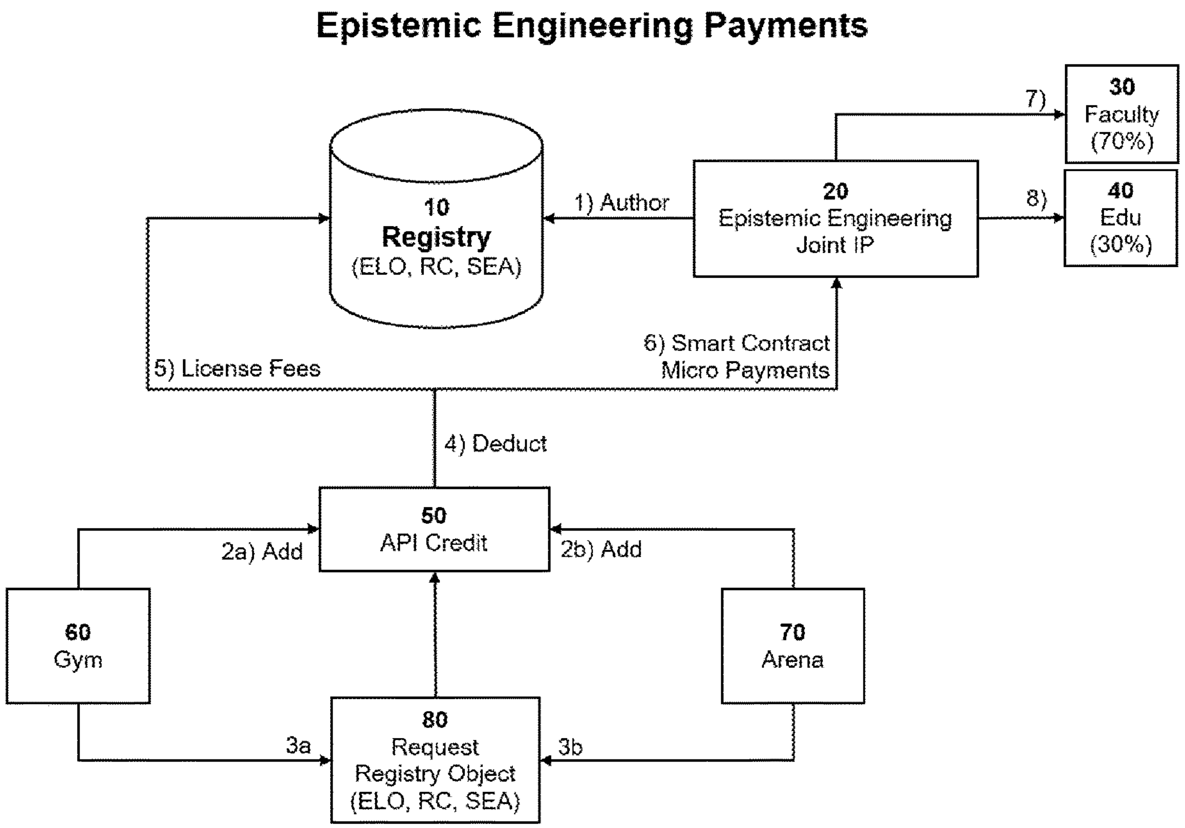
FIG. 8 illustrates Epistemic Engineering Payments starting by EE authoring that allows joint IP (20), followed by the Gym (60) and Arena (70) adding money to a Registry API Credit (50) (steps 2*a*, 2*b*) which gets automatically deducted on EE object (ELO, RC, SEA) usage (step 5) and then IP micropayments automatically split (step 6) in the case of Joint IP (steps 7 and 8).
Figure 9:
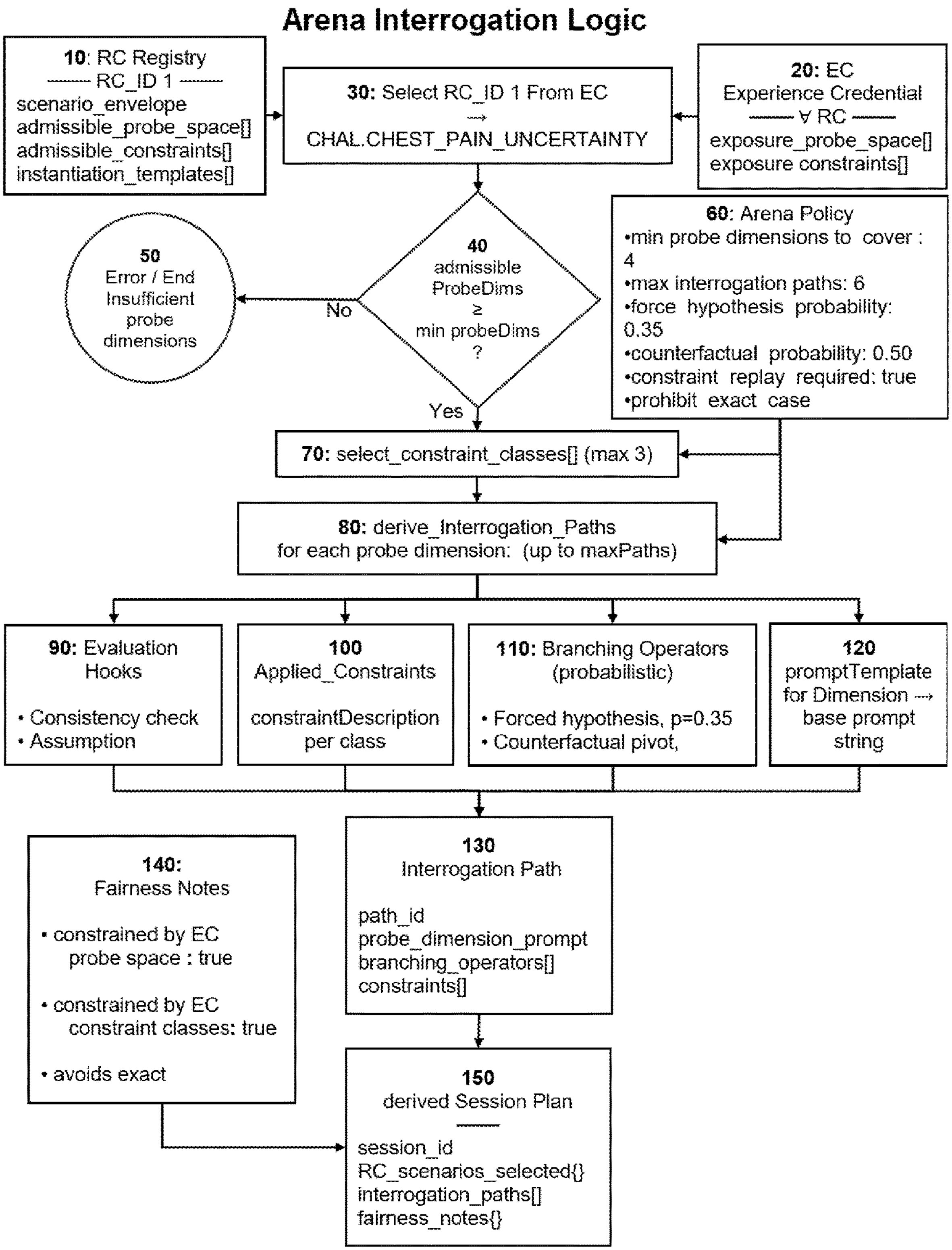
FIG. 9 is a logic flowchart of the Arena Interrogation Logic, detailing the Admissibility Check (40), Derivative Path Generation (80), and the application of probabilistic Branching Operators (110).
Figure 10:
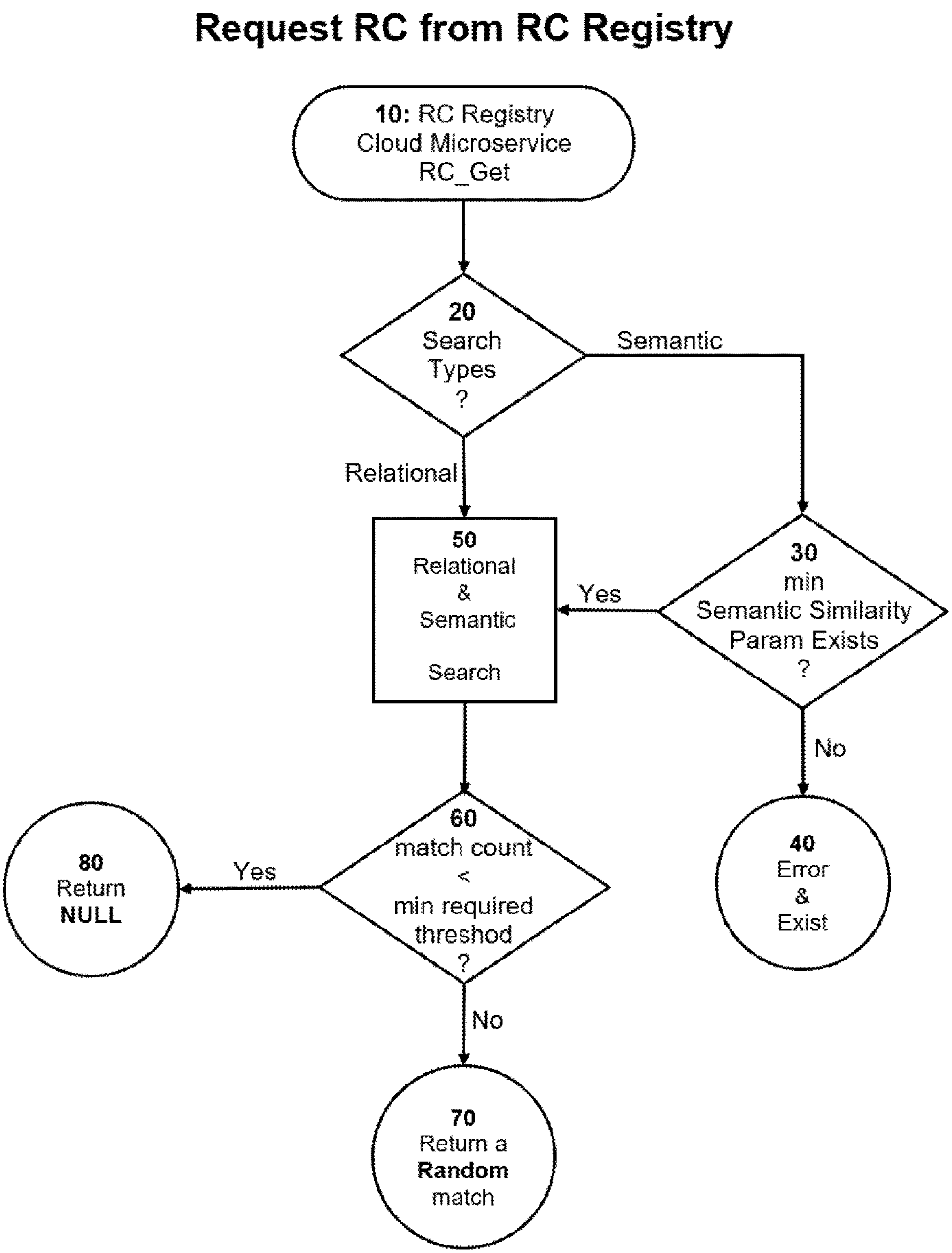
FIG. 10 is a flowchart illustrating the process of a Gym or Arena engine requesting an RC from an RC micro-service Registry (10), the request allowing both relational and semantic search criteria (50) and showing the important gaming inhibition techniques of returning NULL (80) if the count of search matches is less than a strictly governed minimum threshold (60); otherwise, selecting a match randomly (70).

In certain embodiments, compensation distribution may be executed automatically through programmatic payment logic, including smart-contract mechanisms operating on distributed ledger infrastructure. In other embodiments, registry-managed clearing systems may perform payment distribution based on artifact usage records and computed impact scores. FIG. 8 illustrates a payment workflow involving a registry and joint payment split.

The epistemic engineering economy therefore enables tacit human expertise to be transformed into structured machine-consumable assets while providing mechanisms for discovery, governance, attribution, and compensation associated with knowledge contributions.

Epistemic Learning Objects and Artificial Intelligence Reasoning

In certain embodiments, domain knowledge used for reasoning training and evaluation may be organized through epistemic learning objects. An epistemic learning object defines a structured representation of a domain knowledge space including conceptual structures, knowledge sources, and reasoning artifacts. LIST1 and CGS illustrate examples of such structure.

An epistemic learning object may include a hierarchical epistemic table-of-contents defining a conceptual structure of the domain. The epistemic table-of-contents may comprise a plurality of nodes representing concepts, topics, or problem spaces within the domain. Nodes within the hierarchy may maintain relationships including parent-child relationships, sibling relationships, or other conceptual relationships that organize knowledge within the domain.

Nodes of the epistemic table-of-contents may be linked to multiple categories of information. For example, nodes may link to a time-based syllabus, domain content resources such as textbooks, lecture materials, standards documents, research publications, or other informational sources relevant to the domain. Nodes may also link to competency definitions and learning objectives describing expected reasoning capabilities associated with the domain.

Nodes may further reference epistemic artifacts including reasoning challenges, shared experience assets, and expert annotations. Such artifacts may provide structured reasoning scenarios, experiential insights, or explanatory commentary associated with particular concepts within the epistemic knowledge structure.

In certain embodiments, nodes of the epistemic table-of-contents may be decorated with metadata attributes that influence reasoning processes operating within the domain. Such attributes may include semantic weighting parameters, pedagogical attributes, governance parameters, or assessment attributes associated with the node.

Examples of semantic attributes may include parameters such as hierarchy proximity values or rank-up weighting parameters that influence retrieval and reasoning processes associated with the node. Pedagogical attributes may include learning objectives, competency definitions, Bloom taxonomy levels, mastery thresholds, or other indicators of conceptual difficulty or reasoning expectations.

Governance attributes may define parameters such as minimum mastery thresholds, coverage requirements, or remediation limits associated with the node or associated learning activities.

Attributes assigned to nodes may propagate through the hierarchy unless overridden by descendant nodes. For example, attributes assigned to a root node may apply to the entire epistemic learning object, while attributes assigned to intermediate nodes may apply to specific conceptual branches of the hierarchy. Node-level parameters may therefore control reasoning behavior associated with specific conceptual areas of the domain.

In certain embodiments, content sources and knowledge artifacts associated with the epistemic table-of-contents may be processed through a deep semantic compilation process. During deep semantic compilation, content associated with nodes of the epistemic table-of-contents, including deeply referenced resources linked through the node structure, may be ingested and transformed into a unified semantic representation.

The deep semantic compilation process may apply rule-based weighting and domain constraints derived from truth anchors associated with the epistemic learning object. Truth anchors may include authoritative references, ontologies, standards documents, or other domain references used to constrain the semantic interpretation of knowledge sources.

The output of the deep semantic compilation process may be a semantic latent layer representing a bounded semantic domain derived from the epistemic learning object. The semantic latent layer may encode conceptual relationships, domain knowledge representations, and semantic associations between concepts present in the epistemic knowledge structure.

Artificial intelligence reasoning systems may operate within this semantic latent layer to perform reasoning tasks associated with the domain. Because the semantic latent layer is generated from the epistemic learning object, reasoning processes performed by the artificial intelligence system remain constrained to the conceptual boundaries defined by the epistemic knowledge structure.

In certain embodiments, artificial intelligence reasoning systems may perform truth-constrained pedagogical semantic grounding processes when retrieving knowledge from the semantic latent layer. During such processes, candidate knowledge may first be retrieved from the semantic latent layer using semantic similarity measures, relational queries, or other retrieval mechanisms.

Retrieved candidate knowledge may then be validated against truth anchors associated with the epistemic learning object in order to confirm consistency with authoritative domain references. Validation against truth anchors ensures that knowledge used during reasoning processes remains aligned with domain standards or reference sources.

After validation, candidate knowledge may be subjected to a pedagogical re-ranking process that incorporates node-level attributes and annotation signals associated with the epistemic table-of-contents. For example, the re-ranking process may incorporate semantic similarity scores, weighting values associated with the sources of retrieved content, rank-up parameters assigned to nodes of the epistemic table-of-contents, and annotation authority signals associated with expert commentary or peer review.

Annotation authority signals may reflect contributor roles associated with annotations linked to nodes of the epistemic table-of-contents. For example, annotations provided by original authors or domain experts may receive higher authority weighting than annotations contributed by less authoritative contributors.

The re-ranking process may therefore combine semantic similarity measures with pedagogical weighting parameters in order to prioritize knowledge most appropriate for the intended reasoning context. LIST 2 illustrates an example re-ranking algorithm implementation.

Following re-ranking, the artificial intelligence system may generate reasoning prompts or interrogation prompts derived from the retrieved knowledge and associated node context. Such prompts may be designed to elicit reasoning behavior from learners or to conduct reasoning evaluations within the bounded semantic domain defined by the epistemic learning object.

Because the reasoning prompts are generated from knowledge retrieved from the semantic latent layer and validated against truth anchors, the prompts remain constrained to the epistemic domain represented by the epistemic learning object. Artificial intelligence reasoning processes therefore operate within a bounded conceptual domain rather than an unrestricted open-domain knowledge space.

Governed Certification of Reasoning Durability

In certain embodiments, reasoning capabilities of learners may be developed and evaluated within a governance architecture that separates training environments from independent certification environments.

Training may occur within a black box learning gym environment configured to provide experiential reasoning development through interaction with artificial intelligence reasoning systems. The Gym uses a pseudonymous identity and guarantees no learner activity egress. Within the learning gym, learners may engage in Socratic dialog with artificial intelligence agents and may be presented with structured reasoning challenges associated with epistemic learning objects.

Reasoning challenges may simulate real-world problem situations designed to elicit reasoning behavior from the learner. Such challenges may require the learner to analyze information, formulate hypotheses, evaluate alternative explanations, or derive conclusions within the bounded semantic domain defined by the associated epistemic learning object.

During operation of the learning gym environment, the system may record reasoning exposure events describing the reasoning environments encountered by the learner strictly for internal use. Reasoning exposure events may include metadata describing the types of reasoning challenges encountered, conceptual dimensions of the challenge, and contextual parameters associated with the reasoning interaction.

In certain embodiments, the learning gym environment may maintain internal records of learner interactions for instructional purposes. However, sensitive information including learner responses, performance scoring, and training interaction telemetry is restricted to the training environment and may not be exported outside of the Gym.

Following completion of defined training objectives and passing the governed minimum mastery level, the learning gym generates an experience credential summarizing the reasoning exposure obtained during training. The experience credential represents a structured artifact describing the reasoning challenge environments encountered by the learner without disclosing the learner's responses or performance data.

The Experience Credential therefore represents a governed exposure space describing the conceptual dimensions and reasoning contexts to which the learner has been subjected during training. By generating interrogations that test variations of the same conceptual dimensions, together with additional concepts within the Epistemic Learning Object, the Certification Arena verifies reasoning durability without relying on replay of training interactions.

The Experience Credential enables independent certification environments to derive novel interrogations within the same governed exposure space without access to training questions, learner responses, or training telemetry. This separation preserves certification integrity while enabling portable verification of reasoning durability across independent certification arenas.

In certain embodiments, the experience credential may include information describing reasoning challenge definitions, challenge exposure statistics, governance compliance data associated with training operations, and integrity attestations generated by the learning gym environment.

The experience credential excludes personally identifiable information and learner response data. By excluding such information, the credential may be transferred to independent verification environments without exposing the learner's identity or training interaction history.

The experience credential is securely stored and managed by an orchestrator system associated with the learner device or institutional infrastructure. In certain embodiments, the orchestrator may manage cryptographic credentials or device-bound identifiers enabling proof-of-possession verification when presenting the experience credential to external systems.

Issuance of an experience credential occurs only after satisfaction of defined mastery thresholds or governance parameters enforced by the learning gym environment. Such parameters may include mastery levels, coverage thresholds, or other completion criteria associated with the epistemic learning object.

The experience credential may subsequently be presented to an independent certification environment referred to as a certification arena.

The certification arena may perform adversarial interrogation of the learner in order to evaluate reasoning durability within the epistemic domain associated with the experience credential. Interrogation prompts may be derived from the epistemic learning object associated with the credential as well as from reasoning challenge definitions associated with that domain.

Because the experience credential summarizes the reasoning exposure encountered during training without revealing specific prompts or learner responses, the certification arena may generate new interrogation paths that evaluate reasoning capability without relying on memorization of training interactions.

In certain embodiments, the certification arena may perform full-domain interrogation across the epistemic learning object, including conceptual reasoning questions, challenge-based reasoning prompts, or traditional examination questions associated with the domain.

Certification outcomes may be generated by the certification arena based on the learner's reasoning performance during interrogation. Such outcomes may represent verification of reasoning durability within the domain represented by the epistemic learning object.

In certain embodiments, certification outcomes may be reconciled with learner identity through identity provider systems configured to maintain mappings between pseudonymous identifiers and real-world identities. In other embodiments, certification outcomes may be recorded on distributed ledger systems without revealing learner identity, thereby supporting privacy-guaranteed certification configurations.

The governance architecture separating learning gym environments from certification arenas ensures that training systems cannot directly influence certification outcomes while allowing certification authorities to independently verify reasoning capability within defined epistemic domains.

Although specific embodiments have been described for purposes of illustration, various modifications and alternative implementations may be employed without departing from the scope of the claimed invention.

REFERENCE LISTS AND TABLES

This section has content referenced elsewhere in the Spec.

LIST 1: Certification Governance Specification (CGS)

LIST 1 illustrates mandatory and/or optional attributes, sometimes with default values or proposed value ranges, all of which are subject to change by domain experts for each domain separately. Being a specification, items are governed by default.

A) Design-time
- 1- Knowledge Declaration
  - a. ELO Tree 1-4
  - b. Truth Grounding, deep semantic compilation
    - 1. Tree 1: Truth Anchor & Content (TAC)
      - a- Truth type (ontology)
      - b- Content type (lecture notes, textbook)
      - c Content weight (ontology:1.0, SEA:0.98, lecture:0.94, . . . )
    - 2. Tree 2:
      - a- Competencies
      - b- Learning Objectives
    - 3. Tree 3
      - a- Node Params
        - 1 Node ID
        - 2 MinML gate
        - 3 Coverage
        - 4 Remediation
        - 5 RankUp
        - 6 Hierarchy Proximity
        - 7 Bloom Level
        - 8 ML
        - 9 Grading wt -continued b- Assessments
1 Question banks
c- Annotations
1 Authority * Endorsement
d- Practices
1 Unit, cross-unit, capstone
4. Tree 4: Semantic Latent Layer (SLL)
Deep semantic compilation
ReRanking
2- Knowledge Realization
a. Licensable IP
b. EE Artifacts
1. RC
a- Public by default
b- Probes count range
c- Probabilities: forced hypo, counterfactuals
d- Fields
1 Domain Tags
2 Scenario variants
3 Counterfactual templates
4 Reasoning Probes
5 Constraints
2. SEA
a- Institution-Private by default
b- Fields
1 Asset type (e.g. checklist, illness script)
2 Tags
3 Applicability Probes
4 Provanance
3. Annotations
a- Contributor Authority factor
b- Endorser role factor
3- Epistemic Engineering Economy
a. Intellectual Property (IP)
1. Individual or joint with institution
2. Peer-review (author, instructor, peer)
b. Registries
1. Decentralized/Federated
2. Cloud micro services
3. Usage metering
4. Ledger batch update
5. Semantic and relational search
6. Minimum match anti gaming
7. Search Params
a- Node hierarchy proximity
b- UpRank
8. Rerank function
c. Ledger
1. Provenenace
2. Micro-payements
3. Validation
4. Epistemic Impact Score
a- Exportable/ledger-verifiable
b- Contributor authority factor
c- Endorser role factor
d- Un-gamable usage (Arena, no Gym)
e- Active usage (decaying past)
f- Adoption breadth across arenas
B) Runtime
1- "Legal entity separation (Gym, Arena, Payments, Logistics)"
2- learner identity-blindness (pseudonym)
3- Black box (zero learner telemetry egress)
4- Gym
a. Socratic
b. Adaptive
c. Forward-only progress (no gaming)
d. "Proactive Violation Intervention (Instructor Dashboard)"
e. "Internal Engines: EC-Gen, SSS, PPS, LLM-RAG"
f. "Governance Compliance Metering: ELA Param Actuals"
g. Admission
1. """Orchestrator presents gUserID and CET"""
2. Validations: CET, ELO
h. Params
1. minML
2. Remediation
3. RC
i. Certification
1. Async Gym-Cert Heartbeat
2. Revocation ledger
5- Arena
a. Verbal/Adverserial
b. Adaptive
c. ELO coverage
d. EC verification & derivation
e. Admission
1. "Orchestrator presents gUserID, CET, GMT, POP, EC"
2. "Validations: PoP, Gym-Cert, CET, ELO"
f. Pass/Fail Outcome (VRT)
6- EC
a. Gym-Cert Wrapper
b. No learner telemetry
c. Governance compliance telemetry
d. Portable
e. RCs
1. Definition
2. Exposure probes
3. Bucketed stats
7- Identity-Blind Services
a. Payment services
b. Logistics services
C) Infrastructure
1- Orchestrator as trust broker bridge
a. "Learner Device as Orchestrator device hardware (FIDO, TEE)"
b. Opaque Identity Envelope forwarding
c. "Crypto & Atomic Independence (OIE,CET,EC,VRT)"
2- Identity Selector: Institutional Identity Compatibility
a. IdP
b. Sovereign Gym
c. Self-Sovereign
d. Shared-device
3- Privacy: Guaranteed / Preserving
4- Identity-Blind Services: Gym, Arena, Payments, Logistics LIST 2: Illustrative Epistemic Engineering Algorithms
Configurable Constants

| SOURCE WEIGHTS | | AUTHORITY SCORES who authored/contributed | | ENDORSER MULTIPLIERS who peer reviewd | |
|---|---|---|---|---|---|
| SEA: | 0.98 | original_author: | 1.30 | original_author: | 1.45 |
| lecture_notes: | 0.94 | instructor: | 1.20 | instructor: | 1.35 |
| textbook: | 0.85 | peer: | 1.10 | peer: | 1.15 |
| other: | 0.50 | other: | 1.00 | other: | 1.05 |
| | | | | none: | 1.00 |

RankUp

| | |
|---|---|
| discard search chunk: | 0 |
| RANKUP_MAX_DEFAULT: | 2.0 |
| RANKUP_MAX_OTHER_SOURCE: | 1.0 |

A) ReRank Algorithm:

Step 1: Filter by (ML, Bloom Level, Hierarchy Proximity)

Step 2: Formula a: $\text{baseline} = \text{SemSim} \times \text{SOURCE WEIGHTS [source]}^2$ b: $\text{AnnotationScore} = \text{SemSim} \times \text{SOURCE WEIGHTS [source]}^2 \times \text{AUTHORITY SCORES [contributorRole]} \times \text{ENDORSER MULTIPLIERS [endorserRole]} \times \text{clamp (rankUp, 0, RANKUP MAX DEFAULT)}$ c: ReRank (query, chunk)=
baseline if no annotations
max ($AnnotationScore_1$, $AnnotationScore_2$, . . . ) otherwise B) Epistemic Impact Factor (EIF) Algorithm:

Step 1-Trust in the contributer/author and the peer reviewer trust in author endorser (artifact)=AUTHORITY SCORES [contributorRole] ×ENDORSER MULTIPLIERS [endorserRole]

Step 2-Arena usage: certified exam usage only, gym excluded arena usage (artifact)=for each (arena, course, month) usage record:
add uniqueUsers×0.85 ^monthsAgo Step 3-Arena breadth bonus: how many independent arenas adopted it arena adoption (artifact)=log (1+uniqueArenaCount)

Final EIF Score (artifact)=trust in author endorser ×arena adoption×arena usage

TABLE 1

Token Definitions and Trust Envelopes

| Token/ Envelope | Issuer | Contents | Stored | Route | Purpose |
|---|---|---|---|---|---|
| gUserID | Gym or IdP | Persistent pseudonymous identifier crypto-signed) | Device & Gym | Device ⇄ Gym | Key for no-PII profile and learning history |
| OIE (Opaque Identity Envelope) | Edu IdP | Encrypted student identity (encrypted) | Device only | IdP → Device → Arena → IdP | Maps results to real identity without revealing PII to Gym/Arena |
| CET (Course Entitlement Token) | Edu IdP | Course Authorization (crypto-signed) | Device & Gym | IdP → Device → Gym | Confirms enrollment and grants resource access |
| GMT (Graduation Mastery Token) | Gym | CourseID, mastery level, and learner key binding | Device only | Gym → Device → Arena | Proves Gym completion and Arena eligibility |
| PoP Proof (Proof-of-Possession) | Learner Device | Signature over challenge string + GMT hash | Not stored | Device → Arena | Prevents stolen GMT use; binds token to hardware |
| VRT (Verification Result Token) | Arena | Pass/Fail status + EC reference | Device or Ledger | Arena → Device or Ledger | Serves as the "Sovereign Registrar" anchor |
| Gym-Cert Wrapper | Gym | Gym-Cert-data + compliance log (crypto-signed) | Gym | Gym → Device → Arena | Gym certification + compliance log |

TABLE 2

Public Keys and Signing Keys Table
Public Keys and Signing Keys

| Entity | Key Type | Key Name | Purpose |
|---|---|---|---|
| Edu1/RP | Signing keypair | SK Edu1_sign/ PK_Edu1_sign | Signs: CET, optional OIE wrapper |
| Edu1/RP | Encryption keypair | SK Edu1_decrypt/ PK_Edu1_encrypt | Encrypts OIE (only Edu1 can decrypt) |
| Gym | Signing keypair | SK_Gym_sign/ PK_Gym_verify | Signs: GMT and Gym-issued capability artifacts |
| Gym | WebAuthn RP config | N/A | Gym as relying party for WebAuthn credentials |
| Learner Device | WebAuthn credential per RP | K_user_gym, K_user_arena (optional) | Generates PoP signatures bound to GMT |

TABLE 2-continued

Public Keys and Signing Keys Table
Public Keys and Signing Keys

| Entity | Key Type | Key Name | Purpose |
|---|---|---|---|
| Arena | Signing keypair | SK_Arena_sign/ PK_Arena_verify | Signs: exam result artifacts to Edu1, blockchain attestations |
| Arena | WebAuthn RP config (optional) | N/A | Arena authenticates learner device via WebAuthn |
| LP | Token signing key (optional) | N/A | Signs shipper tokens |
| LP | API auth keys/mTLS | N/A | Protects RP ↔ LP fulfillment instructions |
| PP | Token signing key (optional) | N/A | Signs payment tokens |
| PP | API auth keys/mTLS | N/A | Protects RP ↔ PP charges |
| xOrg Trustee | Signing key | N/A | Signs dataset releases/integrity manifests |
| xOrg Trustee | Encryption keys (optional) | N/A | Encrypts data partitions (tier-based) |
| Ledger Trust Registry | Registry keys (optional) | N/A | Publishes PK_Gym_verify, PK_Arena_verify, issuer metadata |

TABLE 3

Secure Routing Topology

| Flow | Route | Description |
|---|---|---|
| Enrollment | IdP → Device | IdP provides the OIE and CET to the learner's secure custody. |
| Training & Graduation | Device ⇄ Gym | Gym uses CET to grant access and emits GMT/EC upon mastery. |
| Gym Admission | Device → Gym | Orchestrator presents gUserID and CET |
| Arena Admission | Device→ Arena | Orchestrator presents Atomic Tokens (GMT, EC, CET, OIE) + PoP. |
| Result Reconciliation | Arena → IdP | Arena returns VRT + OIE (relay) to IdP for transcript update. |
| Sovereign Settlement | Arena → Ledger | Optional: Signed VRT record for IdP-less embodiments. |
| Real-time Monitoring | Gym → Dashboard | Governance Telemetry streamed via SSS (Sanitized Semantic Stream). |
| IP Licensing Sync | Registry→ Ledger | Asynchronous batching of usage data for faculty/institutional credit. |

CONCLUSION, RAMIFICATIONS, AND SCOPE

The systems and methods described herein provide a structured architecture for the development, evaluation, and certification of reasoning capability. The architecture combines epistemic engineering techniques for structuring domain knowledge, bounded artificial-intelligence reasoning systems grounded in epistemic learning objects, and governance mechanisms that separate training environments from independent certification environments.

Through the use of pseudonymous credentials, experience credentials summarizing reasoning exposure, and independent certification arenas, the architecture enables verification of reasoning durability while preserving separation between learner identity, training telemetry, and certification evaluation processes.

Although examples described herein reference medical education and medical ontologies such as SNOMED CT, such examples are illustrative and non-limiting. The disclosed architecture may be applied to any domain in which reasoning capability must be developed and independently verified. Example domains include legal certification environments grounded in statutory and case law references, engineering and technical trades requiring verification of reasoning in complex operational scenarios, and aviation or aerospace training environments involving adversarial simulation of critical events.

In certain embodiments, the described architecture further enables the capture and structured reuse of tacit human expertise through registries of epistemic artifacts. Such artifacts may include reasoning challenges, shared experience assets, and expert annotations that may be discovered, reused, and evaluated across independent systems. Usage of such artifacts may be metered across environments, enabling measurement of epistemic impact and supporting compensation mechanisms associated with knowledge contributions.

Such registries may function as a distributed knowledge infrastructure through which structured reasoning artifacts may be discovered and incorporated into reasoning systems operating across independent environments.

The disclosed systems therefore provide an infrastructure in which domain expertise may be transformed into structured machine-consumable assets, artificial intelligence reasoning processes may be constrained within governed epistemic domains, and certification authorities may independently verify reasoning capability without reliance on training telemetry.

While specific embodiments have been described for purposes of illustration, various modifications and alternative implementations may be employed without departing from the scope of the claimed invention. For example, certification arenas may utilize different artificial intelligence architectures, including large language models or other reasoning systems, and distributed ledger components may be implemented using a variety of consensus or record-management mechanisms.

While specific embodiments have been described, these should not be construed as limiting the invention. Various modifications and variations may be made without departing from the scope of the invention as defined by the appended claims.

I claim:

1. A computer system for certifying reasoning durability of a learner, the system comprising:

1. A learning gym processor configured to conduct experiential reasoning training of a learner through Socratic interaction and presentation of reasoning challenges derived from epistemic learning objects;
2. A certification arena processor configured to generate interrogation prompts derived from an experience credential and to conduct adversarial interrogation of the learner to verify reasoning durability;
3. A learner device configured to store the experience credential and participate in a cryptographic proof-of-possession authentication between the learning gym and the certification arena;
4. A distributed ledger configured to store cryptographic attestations associated with certification events and artifact provenance records; and
5. At least one artifact registry configured to store machine-consumable epistemic artifacts and associated metadata.

2. The system of claim 1, further comprising an identity selector module configured to generate or resolve a persistent pseudonymous identifier associated with a learner, the identity selector module being configured to operate in one or more identity modes comprising:

1. An institutional identity provider configured to assert a mapping between a real-world identity and the persistent pseudonymous identifier;
2. A sovereign device mode configured to generate the persistent pseudonymous identifier without reliance on an external identity provider;
3. A shared-device mode configured to issue temporary pseudonymous assertions associated with a custodial computing environment; and
4. A self-sovereign identity mode configured to retrieve a decentralized identifier associated with the learner from a distributed ledger.

3. The system of claim 1, wherein the certification arena processor generates interrogation prompts derived from reasoning exposure data contained in the experience credential.

* * * * *